US010780778B1

(12) United States Patent
Oliveira Capucho et al.

(10) Patent No.: US 10,780,778 B1
(45) Date of Patent: Sep. 22, 2020

(54) SYSTEM AND METHOD FOR BALANCING FUEL LEVELS AMONG MULTIPLE FUEL TANKS

(71) Applicant: Volvo Truck Corporation, Gothenburg (SE)

(72) Inventors: Maurício José Oliveira Capucho, Curitiba (BR); Rafael Hilario Fonseca Mazzorana, Curitiba (BR)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 16/604,746

(22) PCT Filed: Apr. 17, 2017

(86) PCT No.: PCT/BR2017/050089
§ 371 (c)(1),
(2) Date: Oct. 11, 2019

(87) PCT Pub. No.: WO2018/191798
PCT Pub. Date: Oct. 25, 2018

(51) Int. Cl.
*B60K 15/077* (2006.01)
*B60K 15/035* (2006.01)
*B60K 15/03* (2006.01)

(52) U.S. Cl.
CPC .......... *B60K 15/077* (2013.01); *B60K 15/035* (2013.01); *B60K 2015/03138* (2013.01); *B60K 2015/03144* (2013.01); *B60K 2015/03223* (2013.01); *B60K 2015/03256* (2013.01)

(58) Field of Classification Search
CPC ........ B60K 15/077; B60K 2015/03138; B60K 15/035; B60K 2015/03144; B60K 2015/03223; B60K 2015/03256; B60K 15/03; B60K 15/06
See application file for complete search history.

(56) References Cited

U.S. PATENT DOCUMENTS

| 4,930,537 A | 6/1990 | Farmer |
| 5,983,932 A | 11/1999 | Wagner et al. |

(Continued)

FOREIGN PATENT DOCUMENTS

| CN | 101200165 A | 6/2008 |
| CN | 105128655 A | 12/2015 |
| DE | 102012205544 A1 | 10/2012 |

(Continued)

OTHER PUBLICATIONS

International Search Report and Written Opinion for International Patent Application No. PCT/BR2017/050089, dated Dec. 5, 2017, 8 pages.

*Primary Examiner* — Joseph M Rocca
*Assistant Examiner* — Harold Eric Pahlck, III
(74) *Attorney, Agent, or Firm* — Withrow & Terranova, PLLC (57) ABSTRACT

Systems and methods for balancing levels of liquid fuel among multiple vehicle-mounted fuel tanks utilize at least one control valve that is configured to admit pressurized gas into a first fuel tank while a second fuel tank is ventilated, responsive to detection of a difference of liquid fuel levels within the first and second fuel tanks. Admission of pressurized gas into one fuel tank and ventilation of another fuel tank creates a pressure imbalance that causes liquid fuel to flow through a balancing line connecting the fuel tanks. Balancing may be performed in a bidirectional manner.

20 Claims, 5 Drawing Sheets

(56) References Cited

U.S. PATENT DOCUMENTS 6,382,225 B1 5/2002 Tipton
8,579,332 B2 11/2013 Sonderegger et al.

FOREIGN PATENT DOCUMENTS

| GB | 2076890 A | 12/1981 |
| WO | 0238409 A1 | 5/2002 |
| WO | 2008048267 A1 | 4/2008 |
| WO | 2008155270 A1 | 12/2008 |

SYSTEM AND METHOD FOR BALANCING FUEL LEVELS AMONG MULTIPLE FUEL TANKS

This application is a 35 USC 371 national phase filing of International Application No. PCT/BR2017/050089, filed Apr. 17, 2019, the disclosure of which is incorporated herein by reference in its entirety.

TECHNICAL FIELD

The disclosure relates to systems and methods for transferring liquid fuel between multiple vehicle-mounted fuel tanks to maintain substantially equal fuel levels within such tanks, and vehicles utilizing such systems and methods.

BACKGROUND

Numerous vehicles with internal combustion engines utilize multiple liquid fuel tanks to provide a large fuel capacity. For example, vehicles such as medium-duty and heavy-duty trucks commonly employ two tanks positioned on opposing sides of the truck. It is desirable to draw fuel from the tanks in a way that the fuel levels in the tanks are substantially equal.

Fuel supply systems may not draw fuel evenly from all tanks of a multi-tank fuel supply system, and/or may not return fuel evenly to all tanks if a fuel supply system is of a recirculating type. Differences in height of fuel tanks in a multi-tank system, such as may be attributed to roadways and parking areas with uneven heights, may also contribute to unequal withdrawal of fuel from, and/or unequal return of fuel to tanks in a fuel supply system.

The presence of significantly different amounts of fuel in multiple fuel tanks mounted to a single vehicle can lead to operational and maintenance problems. A substantial weight differential caused by an uneven amount of fuel in the multiple fuel tanks can lead to uneven tire wear. Additionally, if one tank is emptied and air is introduced into a vehicle engine from a fuel supply line connected to the empty tank, the engine may stall and it may be problematic to restart the engine.

Various arrangements for transferring fuel between vehicle-mounted fuel tanks are known. United Kingdom Patent Application Publication No. 2076890A discloses a dual tank fuel supply system in which fuel may be supplied to a secondary fuel tank and transferred via a bottom-mounted crossover line to a first fuel tank (e.g., by an inter-tank pump or by supplying compressed air to the secondary fuel tank), with the first fuel tank being configured to supply fuel to a truck engine. Unfortunately, since bottom-mounted crossover lines are typically arranged along a lowest point of a vehicle, they are generally susceptible to damage since they are exposed to impact from roadway debris and other obstructions.

To address deficiencies associated with bottom-mounted crossover lines, above-tank crossover lines were developed. For example, a multiple tank fuel system utilizing an above-tank crossover line with extensions terminating in lower portions of fuel tanks and relying upon siphoning to transfer fuel between the tanks is disclosed in U.S. Pat. No. 4,930,537. Another example of a multiple tank fuel system utilizing an above-tank crossover line is provided in U.S. Pat. No. 8,579,332, which utilizes an ejector device and a check valve to permit fuel to be supplied from a second tank to a first tank from which fuel is supplied to an engine. With respect to each of these above-tank crossover line systems, however, if any air bubbles are introduced into the crossover line, then such bubbles tend to become trapped therein, and fuel balancing functionality is interrupted.

A need exists in the art for improved fuel supply systems and methods for balancing fuel levels among multiple vehicle-mounted fuel tanks to overcome limitations of conventional systems.

SUMMARY

A system for balancing fuel levels among first and second fuel tanks of a vehicle utilizes at least one control valve that is configured to be operated responsive to at least one signal indicative of a difference of liquid fuel levels in a first fuel tank and a second fuel tank to admit pressurized gas into one of the first fuel tank or the second fuel tank having a higher fuel level, while the other of the first fuel tank or the second fuel tank is ventilated, whereby admission of pressurized gas into one tank while the other tank is ventilated causes liquid fuel to flow through a balancing line to permit balancing of liquid fuel levels. In particular, an imbalance of pressure drives fuel to the tank with the lower fuel level and balancing operation is assured regardless of whether air may initially be present in the balancing line. Methods for balancing fuel levels utilizing pressurized gas to drive liquid fuel from one fuel tank through a balancing line to another fuel tank responsive to at least one signal indicative of a difference in liquid fuel levels between the tanks (e.g., derived from first and second fuel tank level signals) are also provided. In at least certain embodiments, systems and methods provide bidirectional balancing utility.

In one aspect, the disclosure relates to a fuel balancing system for a vehicle that includes a first fuel tank, a second fuel tank, a balancing line connecting the first fuel tank and the second fuel tank to enable fluid communication between the first fuel tank and the second fuel tank, at least one control valve, at least one control element, and first and second sensors. The first sensor is configured to detect a level of liquid fuel in the first fuel tank and produce a first signal, and the second sensor is configured to detect a level of liquid fuel in the second fuel tank and produce a second signal. The at least one control valve is configured to (i) selectively permit fluid communication between the first fuel tank and at least one source of pressurized gas or between the first fuel tank and at least one vent, and (ii) selectively permit fluid communication between the second fuel tank and at least one source of pressurized gas or between the second fuel tank and at least one vent. The at least one control element is configured to compare the first signal and the second signal to identify a difference in level of liquid fuel between the first fuel tank and the second fuel tank, and is configured to operate the at least one control valve to admit pressurized gas into whichever of the first fuel tank or the second fuel tank has a higher fuel level, while the other of the first fuel tank or the second fuel tank is ventilated.

In certain embodiments, the balancing line and the at least one control valve are configured to permit bidirectional fuel balancing utility, whereby liquid fuel may be supplied from the first fuel tank to the second fuel tank when the level of liquid fuel in the first fuel tank exceeds the level of liquid fuel in the second fuel tank, and liquid fuel may be supplied from the second fuel tank to the first fuel tank when the level of liquid fuel in the second fuel tank exceeds the level of liquid fuel in the first fuel tank.

In certain embodiments, the balancing line is devoid of a check valve configured to inhibit transfer of liquid fuel in either direction between the first fuel tank and the second fuel tank. In certain embodiments, a fuel balancing system is devoid of a mechanical pump configured to move liquid fuel in or through the balancing line.

In certain embodiments, the first fuel tank comprises a first liquid fuel inlet, and the second fuel tank comprises a second liquid fuel inlet.

In certain embodiments, the at least one control valve comprises a first control valve associated with the first fuel tank, and a second control valve associated with the second fuel tank. In certain embodiments, the at least one control element comprises a microprocessor-based controller.

In certain embodiments, the fuel balancing system further comprises at least one source of pressurized gas, wherein the at least one source of pressurized gas comprises a vehicle-mounted compressed air source. In certain embodiments, the fuel balancing system further comprises at least one source of pressurized gas, and a pressure regulator arranged between the at least one source of pressurized gas and the at least one control valve. In certain embodiments, the fuel balancing system further comprises at least one vent, wherein the at least one vent is ventilated to ambient air.

In certain embodiments, the balancing line comprises a first opening in fluid communication with a lower portion of the first fuel tank and a second opening in fluid communication with a lower portion of the second fuel tank; and the balancing line extends through an upper portion of the first fuel tank, and extends through an upper portion of the second fuel tank. In certain embodiments, the balancing line is configured to receive liquid fuel returned from an engine. Optionally, a check valve may be arranged in a liquid fuel return line upstream of the balancing line.

Certain embodiments are directed to a land vehicle (e.g., an on-road vehicle or off-road vehicle including wheels or movable tracks) comprising a fuel balancing system as described herein. Other embodiments are directed to a water vehicle (e.g., a boat) comprising a fuel balancing system as described herein.

In another aspect, the disclosure relates to a method for balancing liquid fuel between each fuel tank of a plurality of fuel tanks mounted to a vehicle. The method includes detecting a condition indicative of a level of liquid fuel in a first fuel tank of the plurality of fuel tanks and responsively generating a first signal and detecting a condition indicative of a level of liquid fuel in a second fuel tank of the plurality of fuel tanks and responsively generating a second signal. The method further includes comparing the first signal and the second signal to identify a fuel level differential condition indicative of a difference in level of liquid fuel between the first fuel tank and the second fuel tank. The method further includes, responsive to detection of the fuel level differential condition, operating at least one control valve to admit pressurized gas into one of the first fuel tank or the second fuel tank, while the other of the first fuel tank or the second fuel tank is ventilated, to cause liquid fuel to flow through at least one balancing line connecting each fuel tank of the plurality of fuel tanks to substantially equalize the level of liquid fuel in the first fuel tank and the level of liquid fuel in the second fuel tank.

In certain embodiments, the method includes providing bidirectional fuel balancing utility, such that: when the fuel level differential condition is indicative of a greater level of liquid fuel in the first fuel tank than in the second fuel tank, the method comprises operating the at least one control valve to admit pressurized gas into the first fuel tank while the second fuel tank is ventilated to cause liquid fuel to flow through the at least one balancing line connecting the fuel tanks to substantially equalize the level of liquid fuel in the first fuel tank and the level of liquid fuel in the second fuel tank; and when the fuel level differential condition is indicative of a greater level of liquid fuel in the second fuel tank than in the first fuel tank, the method comprises operating the at least one control valve to admit pressurized gas into the second fuel tank while the first fuel tank is ventilated to cause liquid fuel to flow through the at least one balancing line to substantially equalize the level of liquid fuel in the first fuel tank and the level of liquid fuel in the second fuel tank.

In certain embodiments, the at least one control valve comprises a first control valve associated with the first fuel tank and a second control valve associated with the second fuel tank. A method of operating the at least one control valve comprises operating one of the first control valve or the second control valve to admit pressurized gas into one of the first fuel tank or the second fuel tank while the other of the first fuel tank or the second fuel tank is ventilated to cause liquid fuel to flow through the at least one balancing line connecting the plurality of fuel tanks to substantially equalize the level of liquid fuel in the first fuel tank and the level of liquid fuel in the second fuel tank.

In certain embodiments, admitting pressurized gas into one of the first fuel tank or the second fuel tank comprises flowing compressed air from a vehicle-mounted compressed air source into one of the first fuel tank or the second fuel tank. In certain embodiments, the method further comprises said flowing compressed air through a pressure regulator arranged between the vehicle-mounted compressed air source and at least one of the first fuel tank or the second fuel tank.

In certain embodiments, the other of the first fuel tank or the second fuel tank (i.e., not receiving pressurized air) is ventilated to ambient air.

In certain embodiments, the method further comprises admitting liquid fuel from at least one external fuel source through a first fuel inlet into the first fuel tank, and admitting liquid fuel from the at least one external fuel source through a second fuel inlet into the second fuel tank.

In certain embodiments, the method further comprises terminating the admission of pressurized gas into one of the first fuel tank or the second fuel tank responsive to detection of a condition of the level of liquid fuel in the first fuel tank being substantially equal to the level of liquid fuel in the second fuel tank.

In certain embodiments, the at least one balancing line comprises a first opening in fluid communication with a lower portion of the first fuel tank and a second opening in fluid communication with a lower portion of the second fuel tank and the at least one balancing line extends through an upper portion of the first fuel tank and extends through an upper portion of the second fuel tank. Such an arrangement permits liquid fuel to be withdrawn from, or added into, the lower portion of each fuel tank during performance of a fuel level balancing method.

In another aspect, any of the foregoing aspects, and/or various separate aspects and features as described herein, may be combined for additional advantage. Any of the various features and elements as disclosed herein may be combined with one or more other disclosed features and elements unless indicated to the contrary herein.

Those skilled in the art will appreciate the scope of the present disclosure and realize additional aspects thereof after reading the following detailed description of the preferred embodiments in association with the accompanying drawings.

DETAILED DESCRIPTION

The present disclosure is directed to a system and method for balancing fuel levels among first and second fuel tanks of a vehicle. An exemplary system utilizes sensors to detect liquid fuel levels in the first and second fuel tanks, and at least one control valve that is configured to be operated responsive to at least one signal indicative of a difference of liquid fuel levels in the first and second fuel tanks, to admit pressurized gas into one of the first fuel tank or the second fuel tank having a higher fuel level, while the other of the first fuel tank or the second fuel tank is ventilated. Admission of pressurized gas into one fuel tank while ventilating the other fuel tank creates a pressure imbalance that drives fuel through a balancing line to the tank with a lower liquid fuel level, regardless of whether air may initially be present in the balancing line. Further provided are methods for balancing fuel levels utilizing pressurized gas to drive liquid fuel from one fuel tank through a balancing line to another fuel tank responsive to at least one signal indicative of a difference in liquid fuel levels between the tanks.

The embodiments set forth herein represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

Figure 1:
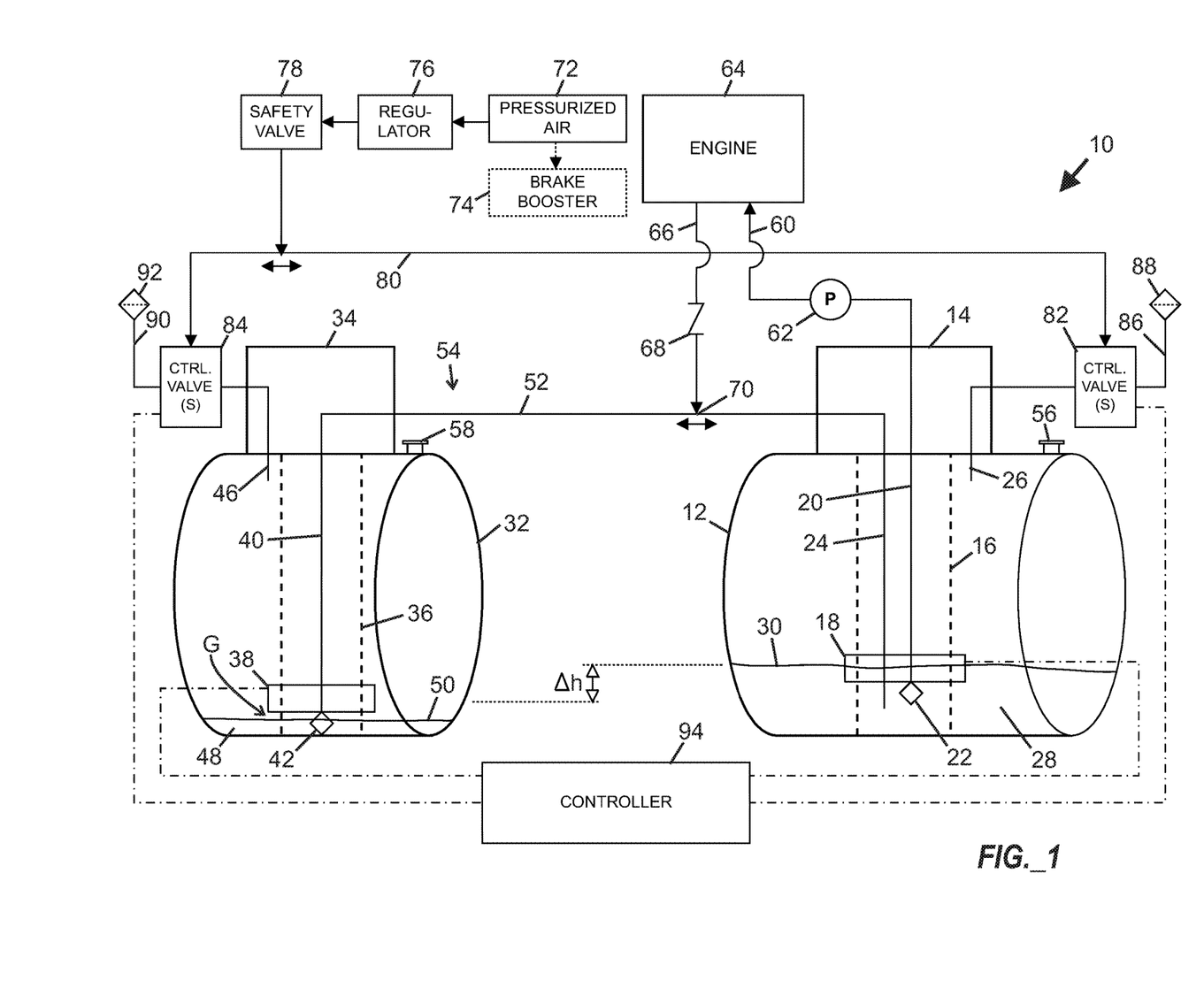
FIG. 1 is a schematic illustration depicting interconnections between components of a fuel balancing system for a vehicle including first and second fuel tanks, with the first fuel tank configured to supply liquid fuel to an engine of the vehicle and the second fuel tank configured to supply liquid fuel to the first fuel tank, according to one embodiment of the present disclosure.

FIG. 1 schematically depicts interconnections between components of a fuel balancing system 10 for a vehicle including a first fuel tank 12 and a second fuel tank 32 according to one embodiment of the present disclosure. The first fuel tank 12 has an associated first fuel sender 14 through which connections to the first fuel tank 12 are made. A perforated first pickup tube 16 is registered with the first fuel sender 14 and extends downward from the first fuel sender 14 into an interior of the first fuel tank 12. A first fuel level sensor 18 may be associated with the first pickup tube 16. A fuel suction line 20 and a first fuel balancing/return segment 24 extend downward from the first fuel sender 14 within an interior of the first pickup tube 16 and terminate in a lower portion of the first fuel tank 12, with the fuel suction line 20 including a first filter or screen 22 at a terminal end thereof. A first tank headspace line 26 also extends through the first fuel sender 14 and terminates in an upper portion (e.g., a headspace portion above liquid fuel 28) of the first fuel tank 12. As shown, the first fuel level sensor 18 may be configured as a float sensor to float on liquid fuel 28 and thereby sense a level 30 of liquid fuel 28 within the first fuel tank 12.

With continued reference to FIG. 1, the second fuel tank 32 has an associated second fuel sender 34 through which connections to the second fuel tank 32 are made. A perforated second pickup tube 36 is registered with the second fuel sender 34 and extends downward from the second fuel sender 34 into an interior of the second fuel tank 32. A second fuel level sensor 38 may be associated with the second pickup tube 36. A second fuel balancing/return segment 40 extends downward from the second fuel sender 34 within an interior of the second pickup tube 36 and terminates in a lower portion of the second fuel tank 32, with a second filter or screen 42 being arranged at the terminal end thereof. A second tank headspace line 46 also extends through the second fuel sender 34, and terminates in an upper portion (e.g., a headspace portion above liquid fuel 48) of the second fuel tank 32. The second fuel level sensor 38 may be configured as a float sensor intended to float on liquid fuel 48 and thereby sense a level 50 of liquid fuel 48 within the second fuel tank 32. As shown in FIG. 1, the second filter or screen 42 may be arranged at the bottom of the second fuel tank 32 above the lowest position of the second fuel level sensor 38, which can result in the actual level 50 of liquid fuel 48 within the second fuel tank 32 being below the second fuel level sensor by a gap G. Such condition causes the second fuel level sensor 38 to indicate a level of liquid fuel in the second fuel tank 32 greater than the actual level 50 of liquid fuel 48 in the second fuel tank 32. This condition is undesirable, in that it provides a false identification of the level 50 of liquid fuel 48 in the second fuel tank 32. Systems and methods disclosed herein to facilitate balancing of fuel level among multiple fuel tanks (e.g., the first fuel tank 12 and the second fuel tank 32) are intended to avoid or mitigate such a condition.

Although FIG. 1 illustrates that all connections to the first fuel tank 12 are made through the first fuel sender 14 and that all connections to the second fuel tank 32 are made through the second fuel sender 34, such configuration is not mandatory. It is to be appreciated that in certain embodiments, one, some, or all of various connections (e.g., first and second pickup tubes 16, 36, first and second fuel level sensors 18, 38, and first and second tank headspace lines 26, 46) to the respective fuel tanks 12, 32 may be separately installed and/or may not be associated with the first and second fuel senders 14, 34.

A balancing line 54 connects for fluid transfer the first and second fuel tanks 12, 32. The balancing line 54 includes a balancing segment 52 extending between the first fuel tank 12 and the second fuel tank 32, and being coupled with the first fuel balancing/return segment 24 and the second fuel balancing/return segment 40. As shown, the balancing line 54 is devoid of a mechanical pump, a venturi, or other mechanical means that would be configured to move liquid fuel in or through the balancing line 54. Additionally, the balancing line 54 is devoid of any check valve or other device configured to inhibit transfer of liquid fuel in either direction between the first fuel tank 12 and the second fuel tank 32. The balancing line 54 thus provides an open conduit between the first fuel tank 12 and the second fuel tank 32 that permits fuel balancing to be performed in a bidirectional manner, such that liquid fuel may be transferred from the second fuel tank 32 to the first fuel tank 12 under appropriate conditions, or liquid fuel may be transferred from the first fuel tank 12 to the second fuel tank 32 under appropriate conditions. In this regard, the first fuel tank 12 includes a first liquid fuel inlet 56, and the second fuel tank 32 includes a second liquid fuel inlet 58, so that an operator can admit fuel to either one of the first or second fuel tanks 12, 32 as desired, and balancing may be performed to equalize fuel levels between the first and second fuel tanks 12, 32.

As shown in FIG. 1, the fuel suction line 20 is configured to extract fuel from the first fuel tank 12, and is coupled to a fuel supply line 60 that contains a fuel pump 62 and that delivers liquid fuel to an engine 64 (e.g., an internal combustion engine) of a vehicle. The second fuel tank 32 is configured to supply fuel to the first fuel tank 12 through the balancing line 54 without being configured to supply fuel directly to the engine 64. (However, as described in more detail in connection with FIG. 2, in certain embodiments, multiple fuel tanks may be configured to supply liquid fuel to an engine.) The fuel pump 62 may supply more liquid fuel to the engine 64 than required for operation of the engine 64. A return line 66 is configured to carry liquid fuel through an optional check valve (also known as a one-way valve) 68 to a junction 70 with the balancing segment 52 of the balancing line 54. If provided, the check valve 68 may serve to prevent fuel being transferred between the first and second fuel tanks 12, 32 from flowing into the return line 66. From the junction 70, liquid fuel may flow (via the first fuel balancing/return segment 24 and/or the second fuel balancing/return segment 40) to the first fuel tank 12 and/or the second fuel tank 32.

The vehicle may have associated therewith a pressurized air source 72, (e.g., air compressor), which may optionally supply pressurized air (typically at a first pressure of about 10 bar (145 psi)) to a brake booster 74 of the vehicle, with the brake booster 74 being separate from the fuel balancing system 10. The same pressurized air source 72 may also be used to supply pressurized air to the first or second fuel tank 12, 32 to permit balancing of fuel levels. A pressure regulator 76 is provided to reduce the air pressure delivered by the pressurized air source 72 to a suitably low, second pressure (e.g., a pressure of less than 1 bar (14.5 psi), such as in a range of from 0.1 bar to 1 bar (1.45 psi to 14.5 psi), or in a range of from 0.1 bar to 0.3 bar (1.45 psi to 4.35 psi)). A pressure relief or safety valve 78 may be arranged downstream of the pressure regulator 76 to ensure that excess air pressure is not supplied to the first or second fuel tank 12, 32 (such as might be encountered upon malfunction of the pressure regulator 76). Downstream of the pressure relief or safety valve 78, pressurized air at the second pressure is supplied via an air supply line 80 to a first control valve assembly 82 associated with the first fuel tank 12, and to a second control valve assembly 84 associated with the second fuel tank 32. The first and second control valve assemblies 82, 84 are operatively coupled to a controller 94, which is also configured to receive signals from the first and second fuel level sensors 18, 38. In certain embodiments, the controller 94 may be embodied in a microprocessor based controller. More generically, one or more control elements (e.g., control circuits) of analog and/or digital varieties may be substituted for the controller 94. In certain embodiments, the controller 94 may be configured to compare signals received from the first and second fuel level sensors 18, 38 to detect a difference in fuel level between the first and second fuel tanks 12, 32. Upon detection of a specified difference in fuel level between the first and second fuel tanks 12, 32, the controller 94 may initiate a fuel level balancing operation, and such operation may be terminated upon detection of a reduced (e.g., zero) difference in fuel level between the first and second fuel tanks 12, 32. In certain embodiments, one or more timers or time circuits (either external or internal to the controller 94) may be initiated upon completion of a fuel level balancing operation to prevent initiation of another fuel level balancing operation until a specified time has passed. Ensuring a time delay between successive fuel level balancing operations may serve to reduce a frequency with which fuel level balancing operations are initiated, thereby avoiding balancing system hysteresis and reducing undue wear on components such as the first and second control valve assemblies 82, 84. Although direct sensing of fuel level may be used as a basis for initiating and/or terminating a fuel level balancing operation, it is to be appreciated that other sensing technologies (e.g., pressure sensing, weight sensing, strain sensing, or the like) that indirectly sense fuel level may alternatively be used, as described in more detail hereinafter.

The first control valve assembly 82 is coupled with a first vent line 86 having an associated first air filter 88, and a second vent line 90 having an associated second air filter 92 is coupled to the second control valve assembly 84. In certain embodiments, each vent line 86, 90 may be ventilated to an ambient air environment.

The first and the second control valve assemblies 82, 84 have a closed state in which there is no communication between the first tank headspace line 26 or second tank headspace line 46 and either the air supply line 80 or the first vent line 86 or second vent line 90. The first and second control valve assemblies 82, 84 have a first open state that connects the air supply line 80 and the first tank headspace line 26 or the second tank headspace line 46 to selectively introduce pressurized air from the air supply line 80 into first fuel tank 12 or the second fuel tank 32, and a second open state that connects the first or second tank headspace line 26, 46 with the respective vent line 86, 90 for ventilation through the first and second vent lines 86, 90. During an operating state when liquid fuel levels are substantially the same in the first and second fuel tanks 12, 32, or upon completion of a balancing operation, the first and second control valve assemblies 82, 84 may be configured to ventilate the first and second fuel tanks 12, 32—such as by opening a flow path between the first tank headspace line 26 and the first vent line 86 using the first control valve assembly 82, and by opening a flow path between the second tank headspace line 46 and the second vent line 90 using the second control valve assembly 84. Alternatively, the first and/or second fuel tanks 12, 32 may be non-ventilated during the foregoing operating state.

As noted previously, a fuel level balancing operation may be initiated when a fuel level differential condition (e.g., indicated by ah in FIG. 1) is detected by the controller 94 upon comparison of liquid fuel level signals obtained from the first and second fuel level sensors 18, 38. Such a fuel level differential condition may correspond to the level 30 of liquid fuel 28 in the first fuel tank 12 differing by a minimum threshold value relative to the level 50 of liquid fuel 48 in the second fuel tank 32. In certain embodiments, the minimum threshold is set to a non-zero value to reduce the likelihood of hysteresis and to reduce undue wear on system components such as the first and second control valve assemblies 82, 84. If the level 30 of liquid fuel 28 in the first fuel tank 12 exceeds the level 50 of liquid fuel 48 in the second fuel tank 32 by the predetermined minimum threshold value, then the first control valve assembly 82 is operated to open a flow path between the air supply line 80 and the first tank headspace line 26, and (if the second fuel tank 32 is not already ventilated) the second control valve assembly 82 is operated to open a flow path between the second vent line 90 and the second tank headspace line 46. Such condition creates a pressure imbalance that drives liquid fuel 28 from the first fuel tank 12 through the balancing line 54 into the second fuel tank 32. This pressure imbalance driving liquid fuel 28 from the first fuel tank 12 into the second fuel tank 32 may be maintained until the level 50 of liquid fuel 48 in the second fuel tank 32 is substantially equal to the level 30 of liquid fuel 28 in the first fuel tank 12 (as detected by the first and second fuel level sensors 18, 38 and compared by the controller 94). Conversely, if the level 50 of liquid fuel 48 in the second fuel tank 32 exceeds the level 30 of liquid fuel 28 in the first fuel tank 12 by the predetermined minimum threshold value, then the second control valve assembly 84 is operated to open a flow path between the air supply line 80 and the second tank headspace line 46, and (if the first fuel tank 12 is not already ventilated) the first control valve assembly 82 is operated to open a flow path between the first vent line 86 and the first tank headspace line 26. Such condition creates a pressure imbalance that drives liquid fuel 48 from the second fuel tank 32 through the balancing line 54 into the first fuel tank 12. This pressure imbalance driving liquid fuel 48 from the second fuel tank 32 into the first fuel tank 12 may be maintained until the level 30 of liquid fuel 28 in the first fuel tank 12 is substantially equal to the level 50 of liquid fuel 48 in the second fuel tank 32.

When substantial equality in fuel level between the first and second fuel tanks 12, 32 is attained, then a fuel level balancing operation may terminate. In certain embodiments, the same threshold value may be used for determining a fuel level differential condition to initiate a fuel level balancing operation (i.e., when the threshold value is exceeded), and for determining substantial equality in fuel level between the first and second fuel tanks 12, 32 to terminate a fuel level balancing operation (i.e., when the threshold value is not exceeded). In other embodiments, a first threshold value may be used for determining a fuel level differential condition to initiate a fuel level balancing operation, and a second threshold value (that differs from the first threshold value) may be used for determining substantial equality in fuel level to terminate a fuel level balancing operation. In certain embodiments, the second threshold value is less than the first threshold value, and/or the second threshold value may be zero.

Although FIG. 1 depicts first and second control valve assemblies 82, 84 associated with the first fuel tank 12 and the second fuel tank 32, respectively, in certain embodiments, a single control valve assembly may be associated with both fuel tanks 12, 32, with the single control valve assembly being configured to selectively supply compressed air to the first fuel tank 12 or the second fuel tank 32 while ventilating the other of the first fuel tank 12 or the second fuel tank 32 under appropriate conditions. In this regard, a fuel balancing system described herein may include at least one control valve assembly. In certain embodiments, a control valve assembly may include one or more multi-way valves (e.g., three-way valves, four-way valves, etc.) and/or combinations of simple binary state valves. Individual valves may be electrically operated (e.g., with motors, solenoids, or the like), hydraulically actuated, or pneumatically actuated.

In certain embodiments, one or more actuatable valves (not shown) operatively coupled to the controller 94 may be arranged within the balancing line 54 and may be configured to be operated responsive to signals obtained from the first and second fuel level sensors 18, 38 to preferentially direct fuel from the return line 66 to one of the fuel tanks 12, 32 (e.g., the fuel tank 12, 32 with the lower fuel level), thereby reducing the frequency for which pressure-based fuel balancing (utilizing the first and second control valve assemblies 82, 84) is needed.

While the first and second fuel level sensors 18, 38 may be embodied in float sensors in one embodiment, the disclosure is not so limited, since any suitable type of sensors or sensing technologies may be used to determine fuel levels in the first and second fuel tanks 12, 32. In certain embodiments, the first and second fuel level sensors 18, 38 may comprise sensors of any suitable types, such as (but not limited to): capacitive sensors, conductivity sensors, magnetic sensors, ultrasonic sensors, Faraday effect sensors, or optical sensors. Additionally, although the first and second fuel tanks 12, 32 are illustrated as being cylindrical in shape with the first fuel tank 12 being larger than the second fuel tank 32, it is to be appreciated that fuel tanks of any suitable shapes and relative sizes may be used in certain embodiments. While the balancing line 54 is depicted as being of an above-tank variety, in alternative embodiments, the balancing line 54 may be embodied in a bottom-mounted crossover line extending between lower portions of the first and second fuel tanks 12, 32.

As noted previously herein, the pressurized air source 72 may comprise an air compressor, such as an air compressor associated with the brake booster 74 of a truck (wherein the brake booster 74 is not part of the fuel balancing system 10). Although the use of an air compressor is contemplated for certain embodiments, in other embodiments, a tank of pressurized air or other pressurized gas (e.g., nitrogen, carbon dioxide, or another gas) may be used to create a pressure imbalance between the first and second fuel tanks 12, 32 to permit balancing of levels of liquid fuel therebetween.

As mentioned previously, when a level of liquid fuel in a fuel tank reaches a very low level (such as the second fuel tank 32 shown in FIG. 1), a sensed level of liquid fuel may differ from the actual level of liquid fuel in the fuel tank, such that a vehicle operator may not have an accurate indication of the remaining operating range of the vehicle. One benefit of fuel level balancing utilizing systems and methods herein, is that all fuel tanks in a multi-tank fuel storage and supply system may be maintained in a state in which fuel level is within a detectable range—thereby providing more accurate fuel amount and operating range information to the vehicle operator, and permitting the vehicle operator to add the right amount necessary for the vehicle route (possibly avoiding the need for excess fuel and its associated weight). Additionally, fuel balancing systems and methods disclosed herein may provide vehicle operators with improved confidence in vehicle telematic information suggesting potential fuel theft. In particular, conventional fuel balancing systems commonly trigger false alerts of fuel theft, since such fuel balancing systems typically operate with a vehicle turned off (after a previous telematics measurement), and restarting of the vehicle causes a new telematics measurement of fuel level to differ from a stored telematics measurement of fuel level. In certain embodiments, fuel balancing systems and methods disclosed herein may be performed while a vehicle is in operation, thereby avoiding false alerts of fuel theft generated by vehicle telematics systems.

Figure 2:
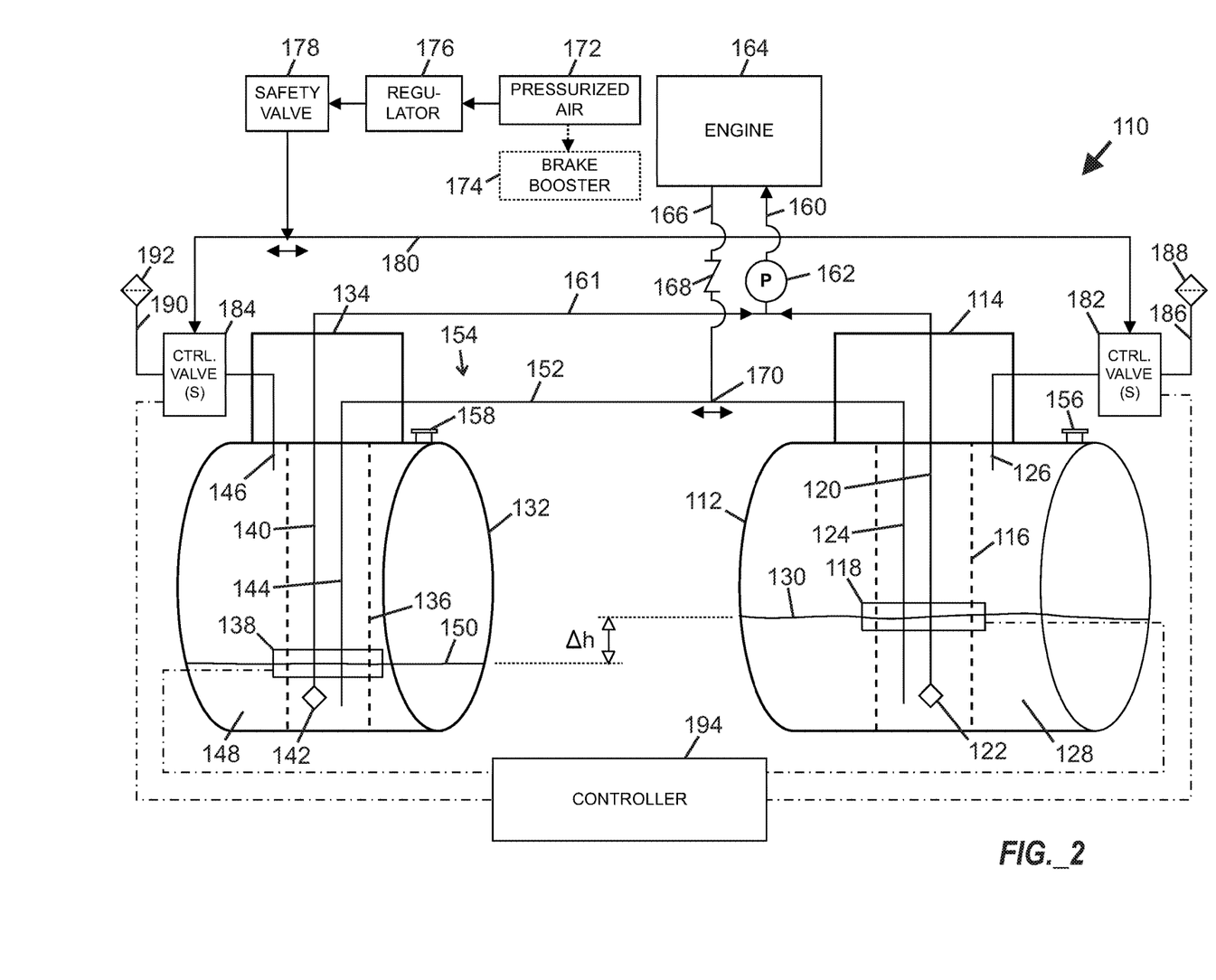
FIG. 2 is a schematic illustration depicting interconnections between components of a fuel balancing system for a vehicle including first and second fuel tanks, with each fuel tank configured to supply liquid fuel to an engine of the vehicle, according to another embodiment of the present disclosure.

FIG. 2 is a schematic illustration depicting interconnections between components of a fuel balancing system 110 for a vehicle including first and second fuel tanks 112, 132, with each fuel tank 112, 132 configured to supply liquid fuel to an engine 164 of the vehicle, according to another embodiment of the present disclosure. Numerous components of FIG. 2 are substantially the same as corresponding components described in connection with FIG. 1, with certain differences. The first fuel tank 112 has an associated first fuel sender 114 through which connections to the first fuel tank 112 are made. A perforated first pickup tube 116 is registered with the first fuel sender 114 and extends downward from the first fuel sender 114 into an interior of the first fuel tank 112. A first fuel level sensor 118 may be associated with the first pickup tube 116. A first fuel suction line 120 and a first fuel balancing/return segment 124 extend downward from the first fuel sender 114 into an interior of the first pickup tube 116 and terminate in a lower portion of the first fuel tank 112, with the first fuel suction line 120 including a first filter or screen 122 at a terminal end thereof. A first tank headspace line 126 also extends through the first fuel sender 114, and terminates in an upper portion (e.g., a headspace portion above liquid fuel 128) of the first fuel tank 112. As shown, the first fuel level sensor 118 may be configured as a float sensor to float on liquid fuel 128 and thereby sense a level 130 of liquid fuel 128 within the first fuel tank 112.

With continued reference to FIG. 2, the second fuel tank 132 has an associated second fuel sender 134 through which connections to the second fuel tank 132 are made. A perforated second pickup tube 136 is registered with the second fuel sender 134 and extends downward from the second fuel sender 134 into an interior of the second fuel tank 132. A second fuel level sensor 138 may be associated with the second pickup tube 136. A second fuel suction line 140 and a second fuel balancing/return segment 144 extend downward from the second fuel sender 134 into an interior of the second pickup tube 136 and terminate in a lower portion of the second fuel tank 132, with the second fuel suction line 140 including a second filter or screen 142 at a terminal end thereof. A second tank headspace line 146 also extends through the second fuel sender 134, and terminates in an upper portion (e.g., a headspace portion above liquid fuel 148) of the second fuel tank 132. The second fuel level sensor 138 may be configured as a float sensor intended to float on liquid fuel 148 and thereby sense a level 150 of liquid fuel 148 within the second fuel tank 132.

A balancing line 154 connects the first and second fuel tanks 112, 132. The balancing line 154 includes a balancing segment 152 extending between the first fuel tank 112 and the second fuel tank 132, and being coupled with the first fuel balancing/return segment 124 and the second fuel balancing/return segment 144. As shown, the balancing line 154 is devoid of a mechanical pump, a venturi, or other mechanical means that would be configured to move liquid fuel in or through the balancing line 154. The balancing line 154 is also devoid of any check valve or other device configured to inhibit transfer of liquid fuel in either direction between the first fuel tank 112 and the second fuel tank 132. The balancing line 154 thus provides an open conduit between the first fuel tank 112 and the second fuel tank 132 that permits fuel balancing to be performed in a bidirectional manner. In this regard, liquid fuel may be transferred from the second fuel tank 132 to the first fuel tank 112 under appropriate conditions, or liquid fuel may be transferred from the first fuel tank 112 to the second fuel tank 132 under appropriate conditions. In this regard, the first fuel tank 112 includes a first liquid fuel inlet 156, and the second fuel tank 132 includes a second liquid fuel inlet 158, so that an operator can admit fuel to either one of the first or second fuel tanks 112, 132 as desired, and balancing may be performed to equalize fuel levels between the first and second fuel tanks 112, 132.

As shown in FIG. 2, the first fuel suction line 120 is configured to extract liquid fuel from the first fuel tank 112, and is coupled to a fuel receiving line 161 that directs fuel to a fuel pump 162 configured to deliver liquid fuel through a fuel supply line 160 to the engine 164 (e.g., an internal combustion engine) of the vehicle. In a similar manner, the second fuel suction line 140 is configured to extract liquid fuel from the second fuel tank 132, and is coupled to the fuel receiving line 161 upstream of the fuel pump 162 and the fuel supply line 160. Liquid fuel may therefore be supplied from one or both of the first and second fuel tanks 112, 132 to the engine 164.

A return line 166 is configured to transport liquid fuel through an optional check valve (also known as a one-way valve) 168 to a junction 170 with the balancing segment 152 of the balancing line 154. If provided, the check valve 168 may serve to prevent fuel in the balancing segment 152 from flowing into the return line 166. From the junction 170, liquid fuel may flow (via the first fuel balancing/return segment 124 and/or the second fuel balancing/return segment 144) to the first fuel tank 112 and/or the second fuel tank 132.

The vehicle may have associated therewith a pressurized air source 172, (e.g., air compressor), which may optionally supply pressurized air to a brake booster 174 of the vehicle, with the brake booster 174 being separate from the fuel balancing system 110. The same pressurized air source 172 may also be used to supply pressurized air to the first or second fuel tank 112, 132 to permit balancing of fuel levels. A pressure regulator 176 is provided to reduce the air pressure delivered by the pressurized air source 172 to a suitably low, second pressure. A pressure relief or safety valve 178 may be arranged downstream of the pressure regulator 176 to ensure that excess air pressure is not supplied to the first or second fuel tank 112, 132 (such as might be encountered upon malfunction of the pressure regulator 176). Downstream of the pressure relief or safety valve 178, pressurized air at the second pressure is supplied via an air supply line 180 to a first control valve assembly 182 associated with the first fuel tank 112, and to a second control valve assembly 184 associated with the second fuel tank 132. The first and second control valve assemblies 182, 184 are operatively coupled to a controller 194, which is also configured to receive signals from the first and second fuel level sensors 118, 138.

The first control valve assembly 182 is coupled with a first vent line 186 having an associated first air filter 188, and the second control valve assembly 184 is coupled with a second vent line 190 having an associated second air filter 192. In certain embodiments, each vent line 186, 190 may be ventilated to an ambient air environment.

The first and the second control valve assemblies 182, 184 permit the first fuel tank 112 and the second fuel tank 132 to be selectively pressurized or vented by either permitting introduction of pressurized air from the air supply line 180, or by permitting ventilation through the first and second vent lines 186, 190. During an operating state when liquid fuel levels are substantially the same in the first and second fuel tanks 112, 132, or upon completion of a balancing operation, the first and second control valve assemblies 182, 184 may be configured to ventilate the first and second fuel tanks 112, 132. Such ventilation may be accomplished by opening a flow path between the first tank headspace line 126 and the first vent line 186 using the first control valve assembly 182, and by opening a flow path between the second tank headspace line 146 and the second vent line 190 using the second control valve assembly 184. Alternatively, the first and/or second fuel tanks 112, 132 may be non-ventilated during the foregoing operating state. The first and second control valve assemblies 182, 184 have a closed state in which no flow is allowed through the control valve assemblies into or out of the fuel tanks.

Operation of the fuel balancing system 110 according to FIG. 2 is substantially the same as described in connection with the fuel balancing system 10 of FIG. 1, with the exception that the system of FIG. 2 permits liquid fuel to be supplied from both the first fuel tank 112 and the second fuel tank 132 to the engine 164. Briefly, a fuel level balancing operation may be initiated when a fuel level differential condition (e.g., indicated by $\Delta h$ in FIG. 2) is detected by the controller 194 upon comparison of liquid fuel level signals obtained from the first and second fuel level sensors 118, 138. If the level 130 of liquid fuel 128 in the first fuel tank 112 exceeds the level 150 of liquid fuel 148 in the second fuel tank 132 by a predetermined minimum threshold value, then the first control valve assembly 182 is operated to open a flow path between the air supply line 180 and the first tank headspace line 126, and (if the second fuel tank 132 is not already ventilated) the second control valve assembly 184 is operated to open a flow path between the second vent line 190 and the second tank headspace line 146. Conversely, if the level 150 of liquid fuel 148 in the second fuel tank 132 exceeds the level 130 of liquid fuel 128 in the first fuel tank 112 by the predetermined minimum threshold value, then the second control valve assembly 184 is operated to open a flow path between the air supply line 180 and the second tank headspace line 146, and (if the first fuel tank 112 is not already ventilated) the first control valve assembly 182 is operated to open a flow path between the first vent line 186 and the first tank headspace line 126. When substantial equality in fuel level between the first and second fuel tanks 112, 132 is attained, then a fuel level balancing operation may terminate. In certain embodiments, the same threshold value or two different threshold values may be used for determining a fuel level differential condition to initiate a fuel level balancing operation, and for determining substantial equality in fuel level between the first and second fuel tanks 112, 132 to terminate a fuel level balancing operation.

In certain embodiments, methods other than detection of a reduced (e.g., zero) difference in fuel level between multiple fuel tanks may be used to initiate and/or terminate a fuel level balancing operation. In certain embodiments, fuel tanks may include pressure sensors, and a fuel level balancing operation may be terminated responsive to signals received from the pressure sensors. For example, each fuel tank in a multi-tank system may include an internal pressure sensor arranged proximate to a bottom thereof, whereby liquid contents of the fuel tank will apply hydrostatic pressure to the pressure sensor associated with that fuel tank, and hydrostatic pressure detected by each pressure sensor may serve as a proxy for liquid level within the respective tank. Detection of a hydrostatic pressure differential for different fuel tanks exceeding a first threshold value may be used to initiate a fuel level balancing operation, whereas detection of a hydrostatic pressure differential of less than a second threshold value (e.g., wherein the second threshold value is less than or equal to the first threshold value) may be used to terminate a fuel level balancing operation. In certain embodiments, weight-related conditions of different fuel tanks may be monitored to provide an indication of fuel level that may be used to initiate and/or terminate a balancing operation. For example, strain gauges may be associated with fuel tank support members, wherein a strain value generated by a strain gauge for a particular fuel tank (i.e., depending on the weight of the fuel tank) may serve as a proxy for fuel level in that fuel tank. Alternatively, each fuel tank may include an associated weight scale, wherein a weight value generated by a weight scale for a particular fuel tank may serve as a proxy for fuel level in that tank. In certain embodiments, a fuel level balancing operation as described herein may be performed for a predetermined or user-defined time period, such that a timer is started when the fuel level balancing operation is initiated, and the fuel level balancing operation is terminated responsive to a signal from the timer that the predetermined or user-defined time period has elapsed.

Although FIGS. 1 and 2 each depict two fuel tanks (e.g., fuel tanks 12, 32 and 112, 132) and a single balancing line (e.g., balancing lines 54 and 154), it is to be recognized that the principles disclosed herein may be used to balance levels of liquid fuel among more than two (e.g., three, four, or more) fuel tanks, with appropriate modifications to balancing lines and control valve assemblies. In certain embodiments, a balancing line may be replaced with a balancing manifold connecting three or more fuel tanks, with control valve assemblies configured to perform balancing among multiple tanks in parallel or in a sequential manner.

Figure 3:
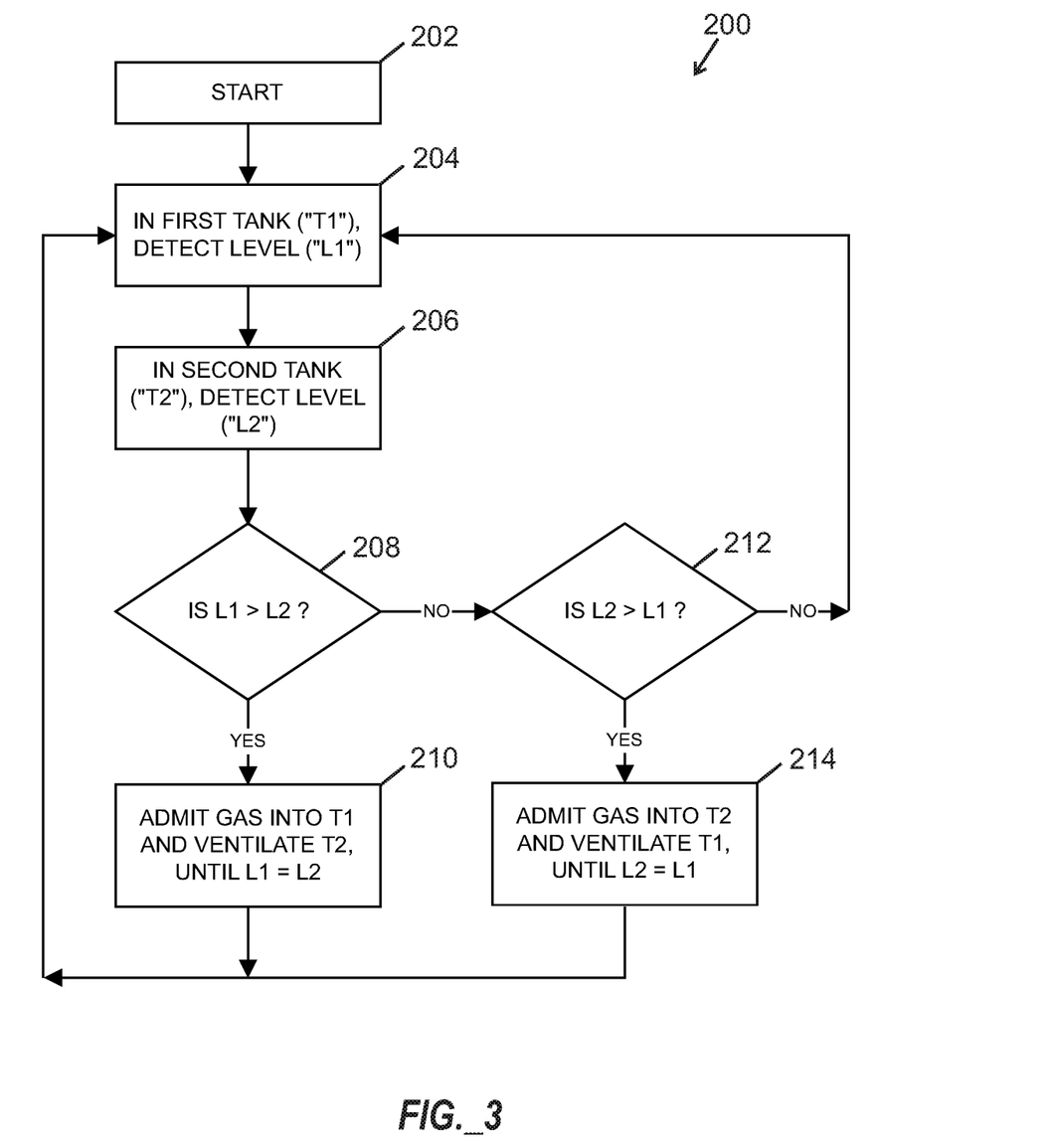
FIG. 3 is a flowchart identifying steps of a method for balancing liquid fuel between fuel tanks of multiple fuel tanks mounted to a vehicle according to one embodiment of the present disclosure.

FIG. 3 is a flowchart identifying steps of a method 200 for balancing liquid fuel between fuel tanks of multiple fuel tanks mounted to a vehicle, according to one embodiment. A first block 202 represents a starting point. As indicated in block 204, a method step includes detecting a level ("L1") of liquid fuel in a first fuel tank ("T1"). As indicated in block 206, another method step includes detecting a level ("L2") of liquid fuel in a second fuel tank ("T2"). The foregoing steps may be performed using first and second level sensors as described previously herein, and in certain embodiments, levels of fuel (L1 and L2) in the first and second fuel tanks (T1 and T2) may be detected simultaneously. Blocks 208 and 212 represent method steps in which L1 and L2 are compared. As indicated in block 208, if L1 is greater than L2 (e.g., L1 exceeds L2 by a predetermined minimum threshold value), then the method proceeds to block 210, according to which pressurized gas is admitted into the first fuel tank (T1) and the second fuel tank (T2) is ventilated until L1 is substantially equal to L2, and the method returns to block 204. Alternatively, if L2 is greater than L1 (e.g., L2 exceeds L1 by a predetermined minimum threshold value), then the method proceeds to block 214, according to which pressurized gas is admitted into the second fuel tank (T2) and the first fuel tank (T1) is ventilated until L2 is substantially equal to L1, and the method returns to block 204. If L1 is not greater than L2 according to block 208, and L2 is not greater than L1 according to block 212, then the method returns to block 204 to continue monitoring of liquid fuel levels (L1 and L2) in the first and second fuel tanks (T1 and T2).

Figure 4:
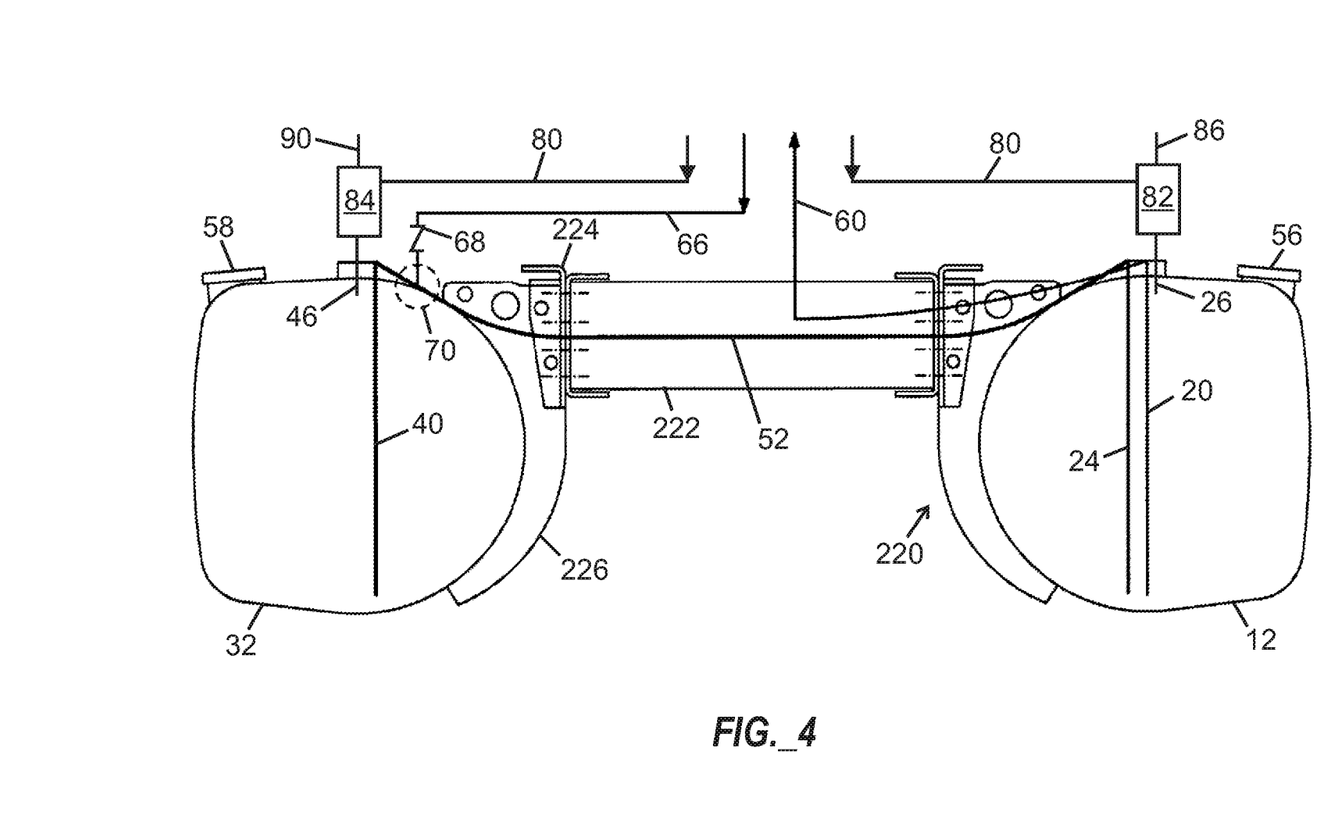
FIG. 4 is a cross-sectional front elevation view of a portion of a vehicle with first and second fuel tanks and illustrating certain components of a fuel balancing system consistent with FIG. 1, according to one embodiment of the present disclosure, including a balancing line routed along a frame cross-member of the vehicle.

FIG. 4 is a cross-sectional front elevation view of a portion of a vehicle with first and second fuel tanks 12, 32 and illustrating certain components of a fuel balancing system consistent with the schematic illustration of FIG. 1, according to one embodiment of the present disclosure. A subframe 220 of the vehicle includes a frame cross-member 222 extending between longitudinal frame members 224 to which tank supports 226 are mounted. The tank supports 226 are arranged to structurally support the first and second fuel tanks 12, 32. The first fuel tank 12 includes a first liquid fuel inlet 56 along a top lateral surface thereof, with a fuel suction line 20 and a first fuel balancing/return segment 24 extending downward from a top wall into an interior of the first fuel tank 12 to terminate a lower portion (e.g., within 10% or within 5% of a tank vertical dimension) of the first fuel tank 12. Additionally, a first tank headspace line 26 terminates in an upper portion of the first fuel tank 12, and is operatively coupled to a first control valve assembly 82 that is further coupled to an air supply line 80 and a first vent line 86. The second fuel tank 32 includes a second liquid fuel inlet 58 along a top lateral surface thereof, with a second fuel balancing/return segment 40 extending downward from a top wall into an interior of the second fuel tank 32 to terminate a lower portion (e.g., within 10% or within 5% of a tank vertical dimension) of the second fuel tank 32. A second tank headspace line 46 terminates in an upper portion of the second fuel tank 32, and is operatively coupled to a second control valve assembly 84 that is further coupled to the air supply line 80 and a second vent line 90. As shown in FIG. 4, a balancing segment 52 coupled with the first fuel balancing/return segment 24 and the second fuel balancing/return segment 40 may be configured to extend along a level of the frame cross-member 222 to span between the first and second fuel tanks 12, 32, thereby protecting the balancing segment 52 from exposure to impact from roadway debris and other obstructions during vehicle operation. As further shown in FIG. 4, a fuel supply line 60 is coupled with the fuel suction line 20 to permit liquid fuel to be supplied from the first fuel tank 12 to an engine (not shown), and a return line 66 is configured to return fuel from an engine through a check valve 68 to a junction 70 with the balancing segment 52, thereby permitting liquid fuel to be returned to one or both of the fuel tanks 12, 32. When an imbalance of fuel levels is detected between the first and second fuel tanks 12, 32 (e.g., using fuel level sensors, not shown), the first and second control valve assemblies 82, 84 may be operated to admit pressurized gas (e.g., pressurized air) into one of the fuel tanks 12, 32 and to ventilate the other of the fuel tanks 12, 32, thereby creating a pressure imbalance that causes liquid fuel to flow through the balancing segment 52, the first fuel balancing/return segment 24, and the second fuel balancing/return segment 40 into the fuel tank 12, 32 having an initially lower fuel level.

Figure 5:
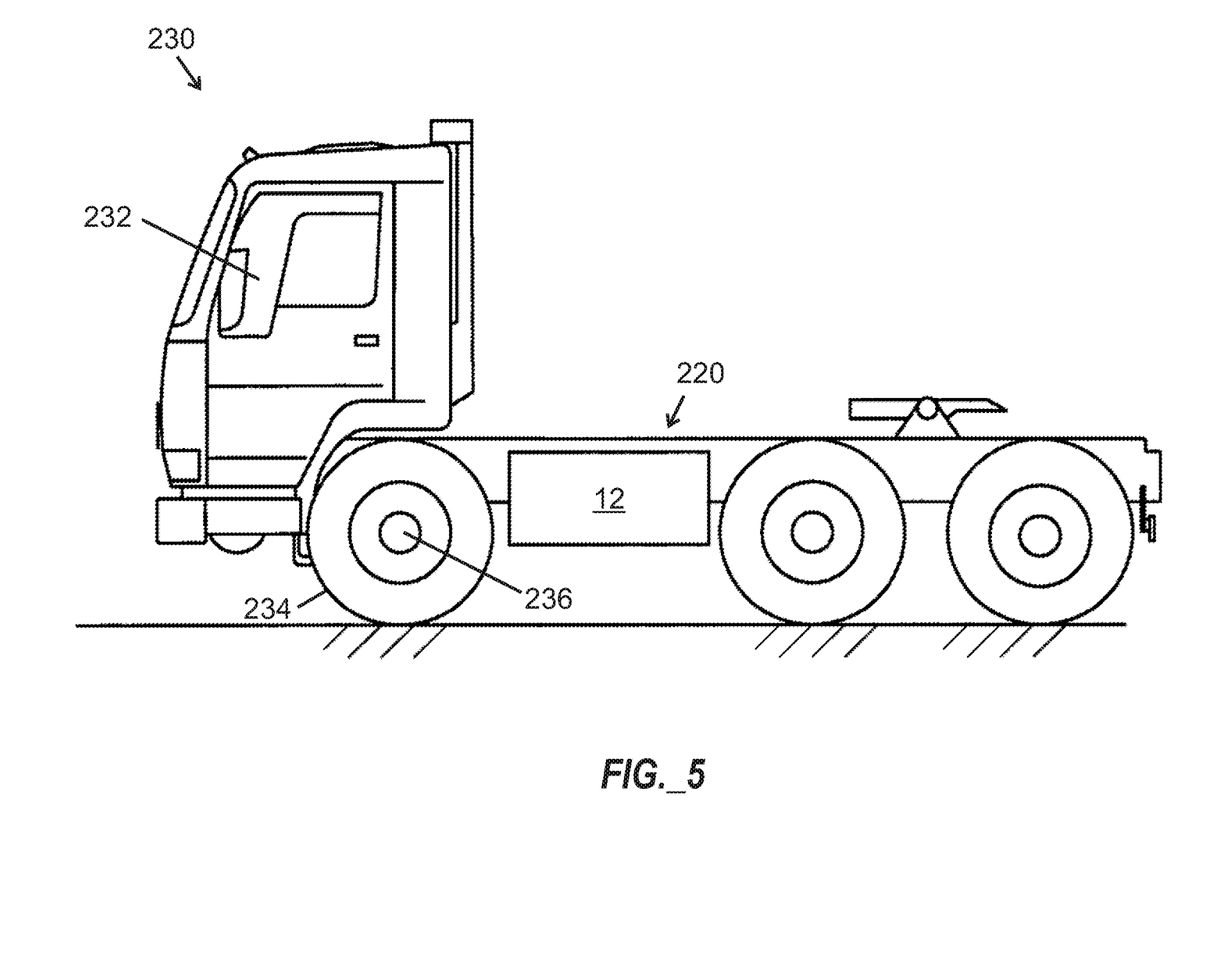
FIG. 5 is a side elevation view of a heavy duty truck including side-mounted fuel tanks and being suitable for utilization of a fuel balancing system as disclosed herein.

FIG. 5 is a side elevation view of a heavy duty truck 230 (e.g., a land vehicle that may be suited for roadway and/or off-road operation) including side-mounted fuel tanks (e.g., a first fuel tank 12 on a driver side of the truck 230 and a second tank (not shown) on a passenger side of the truck 230), and being suitable for utilization of a fuel balancing system as disclosed herein. As shown, the first fuel tank 12 may be supported by a subframe 220 of the truck 230 at a level generally below a passenger cabin 232 of the truck 230, but at a level approximately at or above a centerline 236 of tires 234 of the truck 230.

Utilization of fuel balancing systems and methods according to various embodiments disclosed herein may provide one or more of the following technical benefits: permitting bidirectional fuel level balancing; avoiding entrapment of bubbles in fuel crossover lines (particularly above-tank crossover lines); reduction in cost and complexity of fuel balancing systems (particularly if a vehicle-mounted air compressor is already present); and reduction in false alerts of fuel theft by vehicle telematics systems.

While the invention has been described herein in reference to specific aspects, features, and illustrative embodiments of the invention, it will be appreciated that the utility of the invention is not thus limited, but rather extends to and encompasses numerous other variations, modifications and alternative embodiments, as will suggest themselves to those of ordinary skill in the field of the present invention, based on the disclosure herein. Various combinations and sub-combinations of the structures described herein are contemplated and will be apparent to a skilled person having knowledge of this disclosure. Any of the various features and elements as disclosed herein may be combined with one or more other disclosed features and elements unless indicated to the contrary herein. Correspondingly, the invention as hereinafter claimed is intended to be broadly construed and interpreted, as including all such variations, modifications and alternative embodiments, within its scope and including equivalents of the claims.

What is claimed is:

1. A fuel balancing system for a vehicle, the system comprising:
   a first fuel tank;
   a first sensor configured to detect a level of liquid fuel in the first fuel tank and produce a first signal;
   a second fuel tank;
   a second sensor configured to detect a level of liquid fuel in the second fuel tank and produce a second signal;
   a balancing line connecting the first fuel tank and the second fuel tank to enable fluid communication between the first fuel tank and the second fuel tank;
   at least one control valve configured to (i) selectively permit fluid communication between the first fuel tank and at least one source of pressurized gas or between the first fuel tank and at least one vent, and (ii) selectively permit fluid communication between the second fuel tank and at least one source of pressurized gas or between the second fuel tank and at least one vent; and
   at least one control element configured to compare the first signal and the second signal to identify a difference in level of liquid fuel between the first fuel tank and the second fuel tank, and configured to operate the at least one control valve to admit pressurized gas into whichever of the first fuel tank or the second fuel tank has a higher fuel level, while the other of the first fuel tank or the second fuel tank is ventilated.

2. The fuel balancing system of claim 1, wherein the balancing line and the at least one control valve are configured to permit bidirectional fuel balancing utility, whereby liquid fuel may be supplied from the first fuel tank to the second fuel tank when the level of liquid fuel in the first fuel tank exceeds the level of liquid fuel in the second fuel tank, and liquid fuel may be supplied from the second fuel tank to the first fuel tank when the level of liquid fuel in the second fuel tank exceeds the level of liquid fuel in the first fuel tank.

3. The fuel balancing system of claim 1, wherein the balancing line is devoid of a check valve configured to inhibit transfer of liquid fuel in either direction between the first fuel tank and the second fuel tank.

4. The fuel balancing system of claim 1, being devoid of a mechanical pump configured to move liquid fuel in or through the balancing line.

5. The fuel balancing system of claim 1, wherein the first fuel tank comprises a first liquid fuel inlet, and the second fuel tank comprises a second liquid fuel inlet.

6. The fuel balancing system of claim 1, wherein the at least one control valve comprises a first control valve associated with the first fuel tank, and a second control valve associated with the second fuel tank.

7. The fuel balancing system of claim 1, further comprising at least one source of pressurized gas, wherein the at least one source of pressurized gas comprises a vehicle-mounted compressed air source.

8. The fuel balancing system of claim 1, further comprising at least one source of pressurized gas, and a pressure regulator arranged between the at least one source of pressurized gas and the at least one control valve.

9. The fuel balancing system of claim 1, further comprising at least one vent, wherein the at least one vent is ventilated to ambient air.

10. The fuel balancing system of claim 1, wherein:
the balancing line comprises a first opening in fluid communication with a lower portion of the first fuel tank and a second opening in fluid communication with a lower portion of the second fuel tank; and
the balancing line extends through an upper portion of the first fuel tank, and extends through an upper portion of the second fuel tank.

11. The fuel balancing system of claim 1, wherein the balancing line is configured to receive liquid fuel returned from an engine arranged in fluid communication with the first fuel tank.

12. A method for balancing liquid fuel between each fuel tank of a plurality of fuel tanks mounted to a vehicle, the method comprising:
detecting a condition indicative of a level of liquid fuel in a first fuel tank of the plurality of fuel tanks and responsively generating a first signal;
detecting a condition indicative of a level of liquid fuel in a second fuel tank of the plurality of fuel tanks and responsively generating a second signal;
comparing the first signal and the second signal to identify a fuel level differential condition indicative of a difference in level of liquid fuel between the first fuel tank and the second fuel tank; and
responsive to detection of the fuel level differential condition, operating at least one control valve to admit pressurized gas into one of the first fuel tank or the second fuel tank, while the other of the first fuel tank or the second fuel tank is ventilated, to cause liquid fuel to flow through at least one balancing line connecting the plurality of fuel tanks in order to substantially equalize the level of liquid fuel in the first fuel tank and the level of liquid fuel in the second fuel tank.

13. The method of claim 12, providing bidirectional fuel balancing utility, such that:
when the fuel level differential condition is indicative of a greater level of liquid fuel in the first fuel tank than in the second fuel tank, the method comprises operating the at least one control valve to admit pressurized gas into the first fuel tank while the second fuel tank is ventilated, to cause liquid fuel to flow through the at least one balancing line connecting the plurality of fuel tanks in order to substantially equalize the level of liquid fuel in the first fuel tank and the level of liquid fuel in the second fuel tank; and
when the fuel level differential condition is indicative of a greater level of liquid fuel in the second fuel tank than in the first fuel tank, the method comprises operating the at least one control valve to admit pressurized gas into the second fuel tank while the first fuel tank is ventilated, to cause liquid fuel to flow through the at least one balancing line in order to substantially equalize the level of liquid fuel in the first fuel tank and the level of liquid fuel in the second fuel tank.

14. The method of claim 12, wherein:
the at least one control valve comprises a first control valve associated with the first fuel tank and a second control valve associated with the second fuel tank; and
said operating of the at least one control valve comprises operating one of the first control valve or the second control valve to admit pressurized gas into one of the first fuel tank or the second fuel tank while the other of the first fuel tank or the second fuel tank is ventilated, to cause liquid fuel to flow through the at least one balancing line connecting the plurality of fuel tanks in order to substantially equalize the level of liquid fuel in the first fuel tank and the level of liquid fuel in the second fuel tank.

15. The method of claim 12, wherein the other of the first fuel tank or the second fuel tank is ventilated to ambient air.

16. The method of claim 12, wherein said admitting of pressurized gas into one of the first fuel tank or the second fuel tank comprises flowing compressed air from a vehicle-mounted compressed air source into one of the first fuel tank or the second fuel tank.

17. The method of claim 16, further comprising flowing said compressed air through a pressure regulator arranged between the vehicle-mounted compressed air source and at least one of the first fuel tank or the second fuel tank.

18. The method of claim 12, further comprising admitting liquid fuel from at least one external fuel source through a first fuel inlet into the first fuel tank, and admitting liquid fuel from the at least one external fuel source through a second fuel inlet into the second fuel tank.

19. The method of claim 12, further comprising terminating said admission of pressurized gas into one of the first fuel tank or the second fuel tank responsive to detection of a condition of the level of liquid fuel in the first fuel tank being substantially equal to the level of liquid fuel in the second fuel tank.

20. The method of claim 12, wherein:
the at least one balancing line comprises a first opening in fluid communication with a lower portion of the first fuel tank and a second opening in fluid communication with a lower portion of the second fuel tank; and
the at least one balancing line extends through an upper portion of the first fuel tank, and extends through an upper portion of the second fuel tank.

\* \* \* \* \*